UNITED STATES PATENT OFFICE.

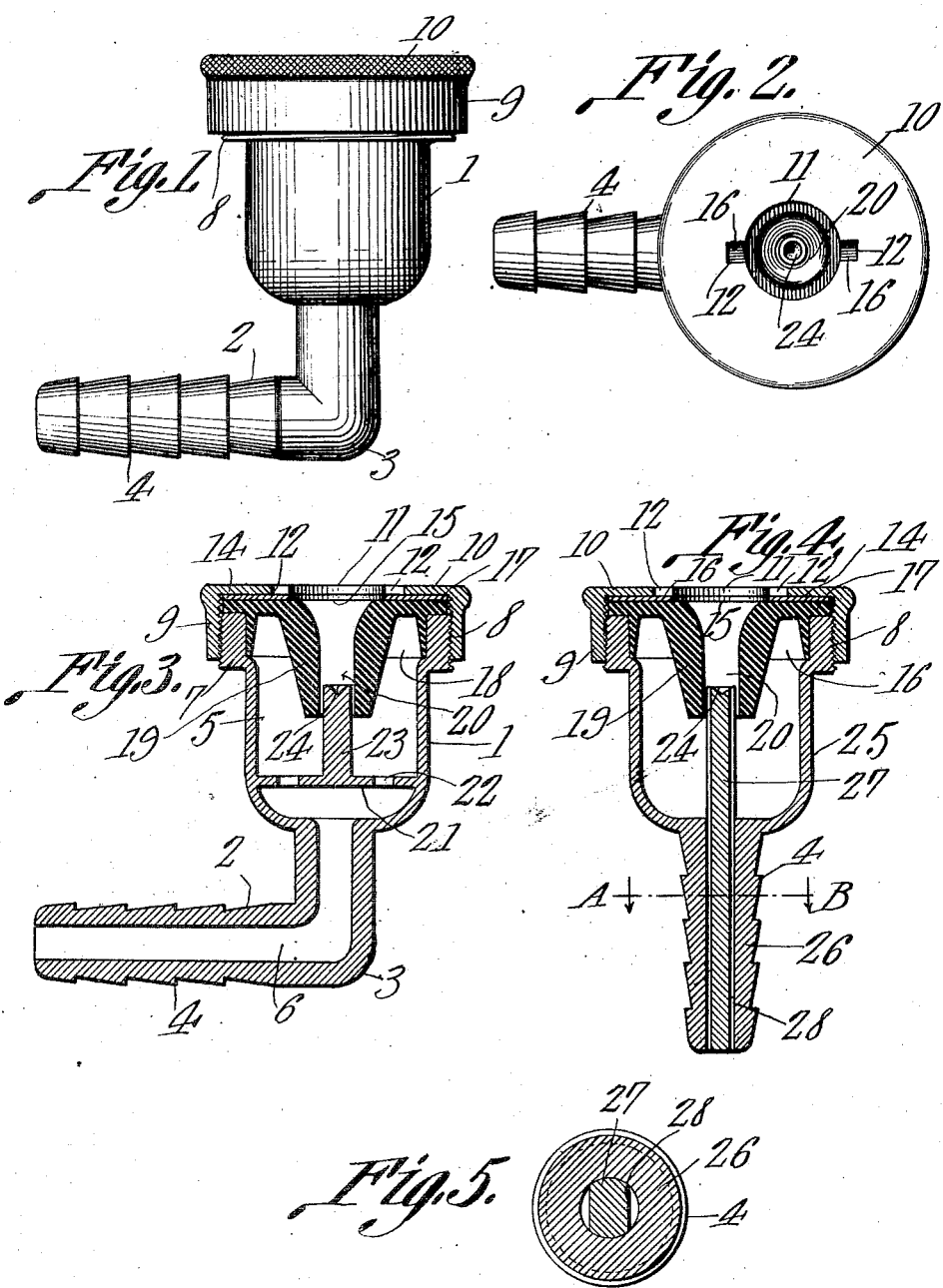

EDWARD J. ROHRBACHER, OF PORTLAND, OREGON.

HOSE-CONNECTOR.

995,185.

Specification of Letters Patent. Patented June 13, 1911.

Application filed July 11, 1910. Serial No. 571,406.

*To all whom it may concern:*

Be it known that I, EDWARD J. ROHRBACHER, a citizen of the United States, residing at Portland, in the county of Multnomah and State of Oregon, have invented a new and useful Hose-Connector, of which the following is a specification.

The device forming the subject matter of this application is adapted to be employed primarily, although not exclusively, for connecting the flexible outlet element of an air pump with the valve of a vehicle tire.

It is the object of this invention to provide a device of the character above mentioned so constructed that a valve or like connecting element may be mounted therein, and yieldably held in place, without injuring the resilient gasket whereby such valve is inclosed.

Another object of the invention is to provide novel means for actuating the movable portion of the valve, when the valve is inserted into the connecting element forming the subject matter of this application.

Another object of the invention is to provide novel means for connecting and assembling the several constituent elements of the device, and for so uniting and combining the same, that a structure of maximum efficiency and strength will result.

The drawings show typical embodiments merely, and changes, properly falling within the scope of what is claimed, may be made without departing from the spirit of the invention.

In the drawings,—Figure 1 is a side elevation; Fig. 2 is a top plan; Fig. 3 is a transverse section; Fig. 4 is a transverse section of a modification; and Fig. 5 is a section upon the line A—B of Fig. 4.

In carrying out the invention, there is provided as a primary and fundamental element, a hollow body 1, reduced at one end to form a pipe 2, bent at an angle at 3, and provided upon its exterior, adjacent one end, with the usual outstanding ribs 4, whereby the body 1 may be connected with the hose of an air pump. The chamber 5 within the body 1 is reduced to form the bore 6 of the pipe 2. Adjacent its open end, the body is thickened peripherally, as shown at 7, and threaded as at 8, to receive the threaded flange 9 of a cap 10. In this cap 10 there is an opening 11, the opening 11 being laterally enlarged, at spaced points, as shown at 12.

Disposed between the cap 10 and the end of the body 1 is a plate 14. This plate 14 fits sufficiently closely within the cap 12, so that it will have practically no sliding movement transversely of the axis of the body 1, the plate 14, however, being free to move longitudinally of the axis of the body 1. In this plate 14 there is an opening 15, maintained in alinement with the opening 11 in the cap 10. The lateral enlargements 12 of the opening 11 in the cap 10 are without their counterparts in the plate 14, and thus, as seen most clearly in Fig. 2 and there denoted by the numeral 16, the plate 14 is adapted to extend beneath the lateral enlargements 12 of the opening in the cap 10.

A resilient gasket is provided, the same including a body 17, adapted to be engaged between the plate 14 and the end of the body 1. Formed integrally with this body 17 is a depending, tapered flange 18, adapted to fit within the body 1. A neck 19, formed integrally with the body 17, depends from the central portion thereof, the bore 20 of the neck 19 being flared, adjacent the cap 10.

Formed integrally with the body 1, or otherwise secured therein, below the end of the neck 19, is a plate 21, provided with suitable ports 22. Attached to the plate 21 and preferably formed integrally therewith, is an upstanding pin 23, the extremity of which is disposed within the bore 20 of the neck 19, the upper end face of the pin 23 being concaved to form a seat 24.

The body of the device may be modified as denoted by the numeral 25 in Fig. 4. In such instance, the shank 26 is disposed in co-axial relation with the body 25, instead of being rectangularly bent, as denoted by the numeral 3 in Fig. 1. The pin 27 is adapted to be driven into the bore of the shank 26, the bore of the shank obviously constituting the inlet for the body 25. The side walls of the pin 27 are cut away, as denoted by the numeral 28 and as seen most clearly in Fig. 5. Thus, although the pin 27 is held securely in place in the bore of the shank 26, the inlet is but partially obstructed by the pin, so that the air may readily find its way into the body 25.

The device is adapted to be employed with a valve having oppositely disposed, radially outstanding lugs. The foregoing brief description of the construction of the valve, will render the same sufficiently clear, without a showing in the drawings of such a valve. The tip of the valve is thrust through the openings 11 and 15 in the elements 10 and 14 respectively, the lugs upon the valve, above referred to, entering the laterally enlarged portions 12 of the opening 11 in the cap 10. There are no corresponding, lateral enlargements in the opening 15 in the plate 14, and consequently the lugs will abut against the plate 14. By rotating the body 1 of the device, the lugs will be engaged between the plate 14 and the cap 10. The resilient gasket 17, exerting a thrust against the plate 14, will serve to hold the lugs of the valve in place between the plate 14 and the cap 10. However, by reason of the fact that the plate 14 is interposed between these lugs and the gasket, the gasket will not be injured by the lugs. The end of the valve will be wedged in the bore 20 of the gasket, the movable member of the valve fitting in the seat 24, the pins 23 and 27 serving to unseat the movable member of the valve, so that the air may readily flow through the valve and into the vehicle tire.

Having thus described the invention, what is claimed is:—

A device of the class described including a hollow body; a cap removably secured thereto and provided with an opening having lateral enlargements; a plate located within the cap and having an opening alined with the opening in the cap, the plate being arranged to extend beneath the enlargements of the opening in the cap; a resilient gasket having an opening alined with the openings in the cap and the plate, the gasket being peripherally disposed between the plate and the body; and a pin rigidly upheld within the body and having one end disposed within the opening in the gasket.

In testimony that I claim the foregoing as my own, I have hereto affixed my signature in the presence of two witnesses.

EDWARD J. ROHRBACHER.

Witnesses:
S. L. MORRIS,
JAMES LITTLE.